Oct. 27, 1931.  C. U. PIERSON  1,828,816
AIR FILTER
Filed Aug. 16, 1930    2 Sheets-Sheet 1

CHARLES U. PIERSON
INVENTOR
BY
ATTORNEY

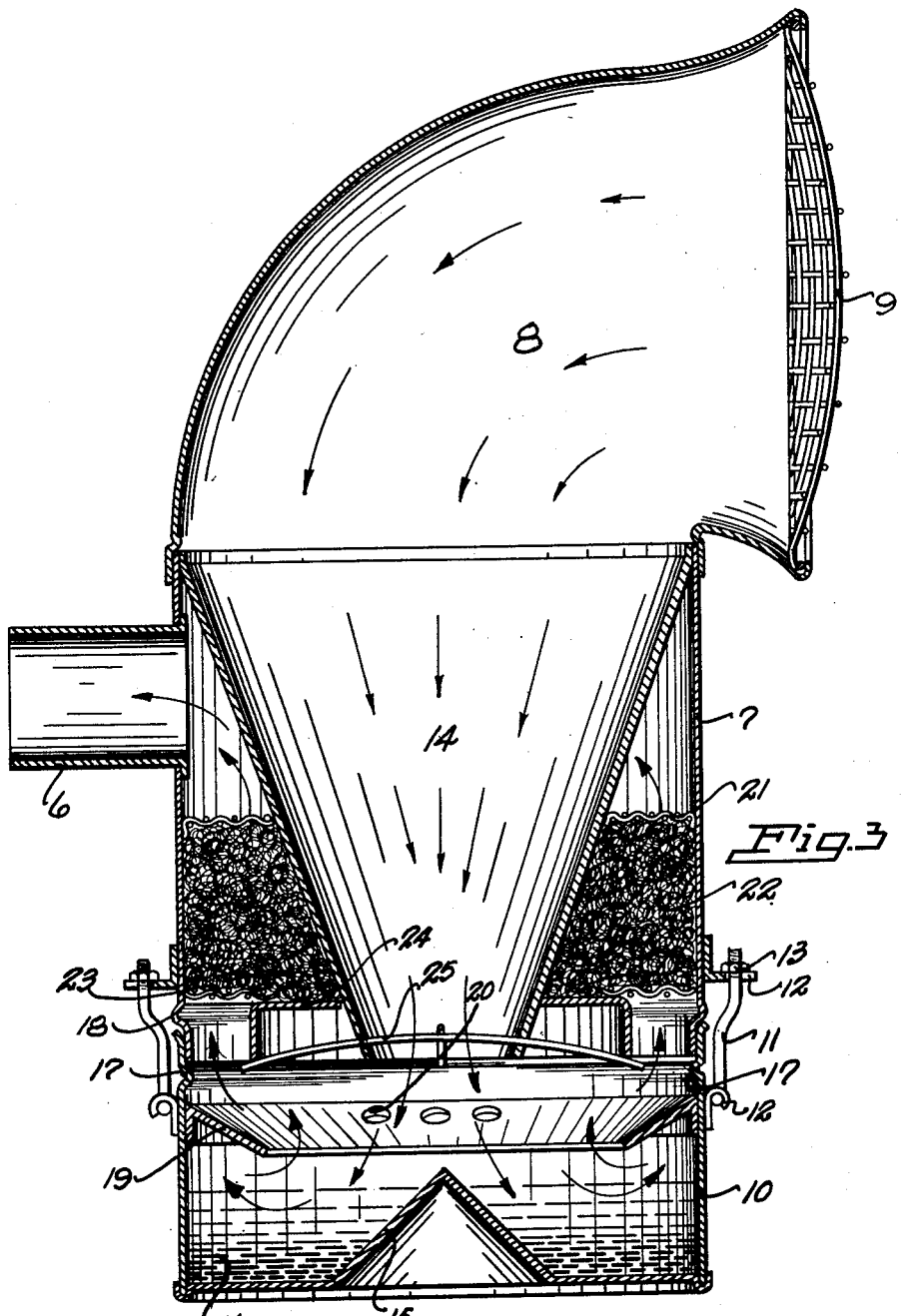

Patented Oct. 27, 1931

1,828,816

UNITED STATES PATENT OFFICE

CHARLES U. PIERSON, OF MOSCOW, IDAHO, ASSIGNOR OF ONE-HALF TO LUTHER JOHNSON, OF SPOKANE, WASHINGTON

AIR FILTER

Application filed August 16, 1930. Serial No. 475,732.

My present invention relates to improvements in air filters of the type especially applicable for use in connection with carburetors employed for feeding fuel mixtures to internal combustion engines or motors for automotive vehicles. In carrying out my invention I locate the filter in juxtaposition to the air-cooling fan of the motor, and I avail myself of the air currents from the fan to effect a force feed through the filter and the force feed or draft approaches the characteristics of a supercharger in feeding the fuel mixture to the cylinders of the motor.

The filter of my invention involves the use of a liquid, as oil, for washing the air or separating therefrom coarse particles of extraneous matter, and in addition, the main filtering medium is of fibrous material, as mineral wool, through which the air is passed for purifying.

To insure facility in assembling and separating the parts of the device, a quick detachable bottom or closure cup is used for the body or casing of the filter, and by the removal of this quick detachable bottom cup the parts may readily be separated for cleansing of the filter to insure at all times a clarified and purified air for the fuel mixture.

The invention consists in certain novel combinations and arrangements of parts used in the construction of the filter as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 3 is a central vertical sectional view, enlarged, of the filter.

Figure 1:
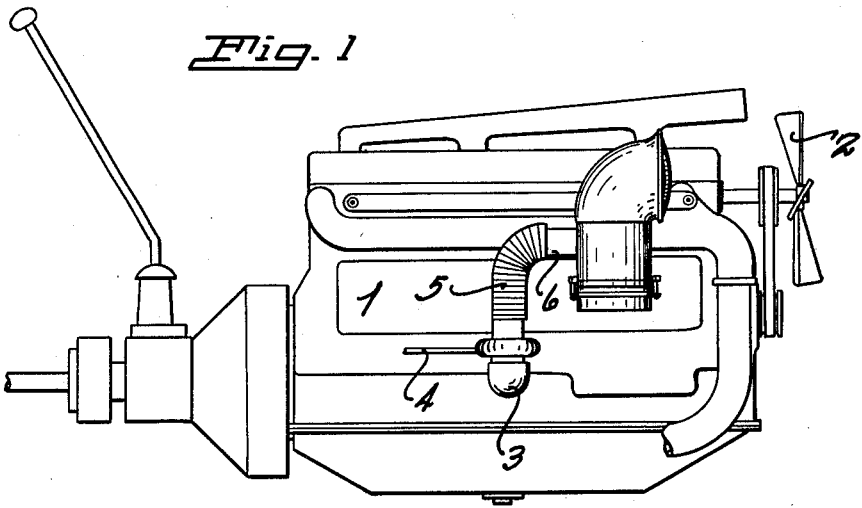
Figure 1 is a side view of an automotive vehicle motor equipped with the air filter of my invention.
Figure 2:
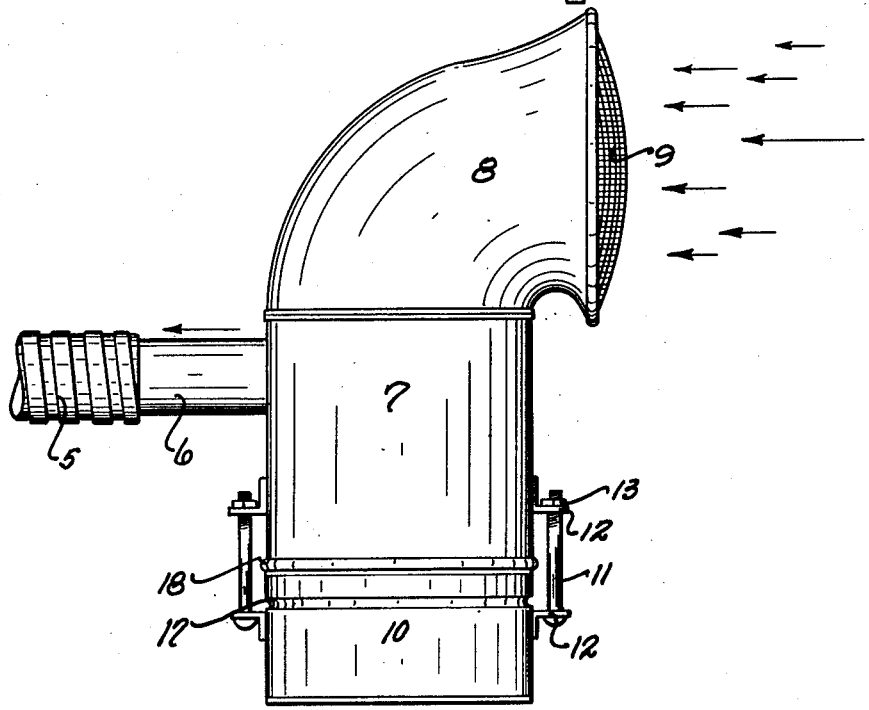
Figure 2 is an enlarged side elevation of the air filter.

In order that the general assembly and relation of parts may readily be understood I have shown in Figure 1 a conventional motor 1 with the air-cooling fan 2, and carburetor 3 which is supplied with gasoline from the pipe 4. In equipping the motor with the air purifier or filter of my invention I utilize a flexible pipe 5 connected to the carburetor in proper relation thereto to furnish the supply of filtered air to the fuel mixture as required, and this flexible pipe is also connected to the filtered air pipe 6 of the filter.

I preferably use a cylindrical casing 7 for the body of the filter and an intake hood or cowl 8 with an entrance screen 9 is mounted on the top of the filter casing, the hood, as shown in Figure 1, being located directly in the path of the air currents from the fan 2, in order that a forced draft of air may be passed through the entrance screen and hood. By the use of the entrance screen 9 the coarsest materials, bugs, insects, etc., are separated from the air before it enters the hood, and within the filter the materials that are small enough to pass through the entrance screen are separated from the air.

In order to gain access to the interior of the filter I use a quick detachable bottom closure or cup 10 for the open bottom of the cylindrical casing, and the cup is fastened to the casing by a number of coupling bolts 11 loosely mounted in angle brackets 12 of the casing and of the cup, and secured by nuts 13.

As indicated by the arrows, the air flows through the hood and down through a funnel, or inverted cone, centrally located within the casing and designated as 14, the larger upper end of the funnel filling the cross area of the casing and the lower smaller end of the funnel occupying only the central part thereof.

The central bottom portion of the bottom cup 10 is fashioned with an interior conical deflecting wall or air spreader 15, and it will be apparent that the funnel tends to increase the velocity of the air blast passing therethrough, and that the blast is directed downwardly against the conical wall or spreader 15. Thus the air blast is spread outwardly over the conical wall into an oil chamber 16 formed in the cup around the conical wall, and as this chamber is filled with oil (or other washing liquid) as shown, to a suitable depth, the coarsest particles of dust are washed from the air by contact of the air currents with the oil.

Before the cup is applied to the filter casing the cup is supplied with oil, then the upper edge of the cup is slipped over the open bottom edge of the casing, and the cup is properly located by the use of an interior crimp or annular shoulder 17 of the cup and an exterior crimp or annular shoulder 18 of the casing. The parts are then locked or fastened together by the use of the bolts 11 and nuts 13 in connection with the brackets 12.

Within the detachable cup a frusto conical baffle ring or flaring annular plate 19 is secured against the face of the cup, and as this plate is located slightly above the apex of the conical deflecting wall, these parts co-act, causing a turbulency in the air that insures intimate contact of the air with the oil for the separation of the coarser particles of dust in the air.

At one side, the baffle wall is perforated, or provided with a number of drain holes 20, through which the oil may be drained for cleansing the cup, after the cup has been detached from the filter casing.

After encountering the deflecting wall and the baffle wall the air currents pass upwardly from the cup, following a path around the free edge of the inverted, frusto-conical baffle wall, and thence upwardly into the filter casing.

Within the filter casing a top screen or ring 21 surrounds the funnel, and a packing or filtering material of mineral wool 22, or other similar fibrous material, is located between this screen ring 21 and a lower, larger screen ring 23 that also surrounds the funnel nearer its bottom end.

The top screen 21 is located just below the air outlet pipe 6, and the bottom screen 23 is located just above the bottom open end of the funnel, and the filter, which thus occupies the annular space between the funnel and the filter casing, is held in place by means of an inverted cup 24 having an open center and surrounding the funnel near its lower end.

The inverted cup is readily detachable in order that the mineral wool and the screens 21 and 23 may be removed for frequent cleansing, and for this purpose I use a pair of crossed spring rods or wires 25, which have their opposite ends passed through holes 26 of the funnel, while their projecting ends rest against the edges of the inverted cup as indicated in Figure 3.

After the bottom cup has been removed as described, the spring wires or pins 25 may readily be withdrawn to free the inverted cup, and the latter, with the filtering screens and fibrous material may be removed for cleansing and replenishing.

The air of course is forced through the filtering material and clarified or filtered, and thence the filtered air passes out through the outlet pipe 6 to the flexible pipe 5 and so to the carburetor.

The lower screen 23 may be soldered or otherwise fastened to the upper face of the inverted cup, and it will be apparent that the mineral wool may be compressed to the required degree by this lower screen against the upper screen, and the latter is pressed upwardly into the decreasing space surrounding the funnel, to form a stop for the filtering fibrous material.

Having thus fully described my invention, what I claim as new and desire to secure by Letters Patent is:—

1. In an air filter, the combination with a casing having a central funnel therein and an inlet hood for the funnel, of a bottom cup for the casing having a central conical deflecting wall below the smaller end of the funnel, a stop screen and a filtering material in the space between the casing and funnel and a bottom screen for the material, an inverted cup surrounding the lower end of the funnel, means for securing the inverted cup to the funnel for compressing the filtering material, and an air outlet pipe from the casing above the filtering material.

2. In an air filter the combination with a casing having a central funnel and an inlet hood for the funnel, of a bottom cup for the casing forming an oil chamber, said cup having a central conical deflecting wall below the lower end of the funnel, an interior flared ring secured to the cup and forming an annular baffle plate above the deflecting wall, a filtering medium located in the annular space between the funnel and the casing, and an air outlet pipe from the casing above the filtering medium.

3. In an air filter, the combination with a casing having a central funnel therein and an inlet hood for the funnel, of a bottom cup for the casing having a central conical deflecting wall, a stop screen and filtering material in the space between the funnel and the casing, a bottom screen for the material, an inverted cup surrounding the lower end of the funnel, a pair of diametrically arranged spring rods located in holes in the funnel with their free ends resting against the edge of the inverted cup for compressing the filtering medium, and an outlet pipe for air above the filtering medium.

In testimony whereof I affix my signature.

CHARLES U. PIERSON.